Patented Feb. 4, 1936

2,029,617

UNITED STATES PATENT OFFICE 2,029,617

SPONGE RUBBER AND METHOD OF MAKING THE SAME

Glen S. Hiers, Cynwyd, Pa., assignor to Collins & Aikman Corporation, Philadelphia, Pa., a corporation of Delaware No Drawing. Application July 31, 1933, Serial No. 683,102

9 Claims. (Cl. 18—50)

My invention is an improved sponge rubber which is free from acid or acid compounds, and a method of making sponge rubber from a frothed or spongy aqueous rubber dispersion without acid coagulation, and preferably by the direct action of heat which liberates the cell forming gas, coagulates the rubber in cellular form, drives off the water, and cures the rubber. By my improvements I am able to form sponge rubber while maintaining the rubber globules in an alkaline medium and to more accurately control the porosity of the finished product.

In accordance with my invention, I add to latex a gum or gums coagulable by the addition of an alkali thereto to form a gel or coagulum of desired stiffness having uncoagulated rubber globules dispersed therein. Such gel or coagulum may be frothed or rendered spongy in any suitable manner, but preferably by the evolution of gas from a suitable non-acid chemical dispersed through the mixture of gum and latex before the gelling thereof. Such evolution of gases is preferably effected by the application to the gel of sufficient heat to decompose the chemicals, coagulate the rubber globules, drive off the water contained in the gel, and cure the rubber.

To obtain a sponge rubber substantially free from impurities it is advantageous to utilize a coagulable gum having a very high viscosity in very dilute concentrations, and which gels very rapidly in the presence of a small quantity of the alkaline reagent.

I preferably utilize for addition to the latex minute quantities of certain vegetable gums generally identified as polysaccharids which in solution are caused to gel by the addition of an alkaline salt of boric acid, such as borax, and which are compatible with and do not tend to coagulate rubber. These gums are preferably white, odorless, tasteless powders derived from vegetable gums having the characteristics of carob-seed derivatives. Such gums are commonly known as caroban, locust-kernel gum, locust bean gum, carob-seed gum, carob-bean gum, gum Hevo, gum Gatto, gum Tragon, Jandagum, Lakoe gum, Lupogum, Luposol, Rubigum, Tragarab, Tragasol, Galagum, Emulsone, Kem, Koniaku, etc., and are generally prepared from the fruit of the carob tree (*Ceritonia siliqua*) or *Conaphallus konjah*. All of these gums may be identified primarily by the gelling action of borax on solutions thereof; and secondarily by the voluminous precipitate and gelling resulting from the addition of neutral lead acetate to solutions thereof and gelling resulting from the addition of basic lead acetate to such solutions; the negative action of iodine solution on solutions thereof; the stringy precipitate resulting from the addition of neutral ferric chloride to solutions thereof; and the precipitate resulting from the addition of tannic acid to solutions thereof. From a consideration of their ash, their ready conversion to an uronic acid, the nature of their hydrolysis products and oxidation to mucic acid, they have been found to contain small quantities of acid polysaccharids and probably belong to the class of polysaccharids known as hemicelluloses.

As an illustration of the practice of my invention, there may be added to a latex compound containing, say, 35% of rubber solids and suitable vulcanizers and anti-oxidants, a 1% of dispersion of locust-kernel gum to a sufficient extent that there is present 0.56% of the solid locust kernel gum on the basis of the rubber solid content To this may be added suitable gas forming ingredients, such, for instance, as ammonium cargbonate, ammonium chloride or ammonium sulphate in the form of a dry powdered salt. Preferably the gas forming material consists of a dry ammonium carbonate approximating 30 to 60% by weight of the dry rubber solids content. The liquid may then be placed in suitable molds or applied to the back of fabrics and on the addition of a borax solution a gel is immediately formed. The amount of borax (dry base) may advantageously approximate in weight the amount of locust-kernel gum present.

Upon subjecting the gel to a temperature of say 210° F., the salt is decomposed with liberation of the gas which is entrapped by the gel and forms a froth or sponge. The continued application of the heat also causes the coagulation of the rubber globules around the gas cells. Upon the evaporation of the water contained in the gel, the rubber may be cured to a desired degree by the continued application of a vulcanizing heat.

By using gum solutions and borax solutions of suitable concentrations, rubber containing jellies of varying consistencies and firmness may be formed varying from gels formed from very dilute solutions containing 0.25% gum or less, which liquefy readily in the presence of heat, to jellies which are practically unaffected when heated 100° C. and are practically heat irreversible gels.

Having described my invention I claim—

1. A sponge rubber formed from an aqueous rubber dispersion containing borax and a vegetable gum coagulable by said borax, and a cell forming agent.

2. In the preparation of sponge rubber the steps which consist in adding to aqueous rubber a vegetable gum jellifiable by borax, gelling the solution formed by such gum and dispersion by adding borax, frothing the gel and coagulating the rubber.

3. In the preparation of sponge rubber, the steps which consist in mixing an aqueous dispersion of rubber with a vegetable gum derived from the fruit of the botanical group *Ceritonia siliqua* or *Conaphallus konjah,* gelling such mixture, frothing the gel, driving off the water from the gel and coagulating the rubber globules therein by heat.

4. In the preparation of sponge rubber, the steps which consist in mixing with an aqueous dispersion of rubber a gel-forming gum derived from the fruit of the botanical group *Ceritonia siliqua* or *Conaphallus konjah* and a gas-forming ingredient, gelling said mixture, heating said gel to evolve gas from said ingredient, driving off the water contained in said gel, and coagulating said rubber.

5. In the preparation of sponge rubber, the steps which consist in mixing with an aqueous rubber dispersion a solution of a vegetable gum having the characteristics of carob-seed derivatives, gelling said mixture by the addition of an alkaline salt of boric acid, and frothing and heating said gel.

6. In the preparation of sponge rubber, the steps which consist in adding to an aqueous rubber dispersion a vegetable gum gellifiable by borax, gelling such gum by adding borax, puffing the mixture of dispersion and gum, and removing the water.

7. A rubber containing jelly consisting of borax and a solution of a gum derivative of the fruit of the botanical group *Ceritonia siliqua* or *Conaphallus konjah* and having rubber globules dispersed in the jelly.

8. The method of forming rubber containing jellies which consists in mixing together rubber and a solution of gum formed from the fruit of the botanical group *Ceritonia siliqua* or *Conaphallus konjah* and gelling the mixture by the addition thereto of an alkaline salt of boric acid.

9. A sponge rubber formed from an aqueous rubber dispersion containing borax, and a vegetable gum coagulable by borax, and a blowing agent.

GLEN S. HIERS.